(12) United States Patent
Massey

(10) Patent No.: US 6,178,736 B1
(45) Date of Patent: Jan. 30, 2001

(54) TURBINE AIRCRAFT ENGINE STARTING METHOD

(75) Inventor: George Massey, Valley Center, KS (US)

(73) Assignee: Lamar Technologies Corporation, Marysville, WA (US)

(*) Notice: Under 35 U.S.C. 154(b), the term of this patent shall be extended for 0 days.

(21) Appl. No.: 09/454,407

(22) Filed: Dec. 3, 1999

Related U.S. Application Data

(62) Division of application No. 08/933,874, filed on Sep. 19, 1997, now Pat. No. 6,018,941.

(51) Int. Cl.⁷ .................................................. F02C 7/268
(52) U.S. Cl. ............................................................ 60/39.02
(58) Field of Search ........................... 60/39.02, 39.142; 244/53 A

(56) References Cited

U.S. PATENT DOCUMENTS

| | | |
|---|---|---|
| 1,924,959 | 8/1933 | Patterson, Jr. . |
| 2,662,986 | 12/1953 | Vintenon . |
| 3,691,759 | 9/1972 | Scheerer . |
| 3,778,632 | 12/1973 | Sarbacher . |
| 3,793,825 | 2/1974 | Dickhart et al. . |
| 3,836,788 | 9/1974 | Carlson et al. . |
| 4,041,696 | 8/1977 | Morrison . |
| 4,788,480 | 11/1988 | Field et al. . |
| 5,844,325 | 12/1998 | Waugh et al. . |
| 5,998,976 | 12/1999 | Steffan . |

FOREIGN PATENT DOCUMENTS 43 44 355 A1  7/1994  (DE) .

OTHER PUBLICATIONS

Rolls Royce Ltd. *The Jet Engine*; Jul., 1969. pp. 123–125.*

* cited by examiner

Primary Examiner—Louis J. Casaregola
(74) Attorney, Agent, or Firm—Wells, St. John, Roberts, Gregory & Matkin P.S.

(57) ABSTRACT

Turbine aircraft engine starter systems and controllers for use therewith, and methods of starting turbine aircraft engines are described. A starter is operably connected with an aircraft engine and configured to initiate an engine start cycle which includes engine rotation and a fuel ignition point. A power source is connected with the starter and is configured to provide power thereto in accordance with at least first and second settings which apply different magnitudes of voltage to the starter. The first setting initiates the engine start cycle and the second setting accelerates the engine through the start cycle after the fuel ignition point. A controller is operably connected with the starter and the power source and is configured to monitor the engine start cycle and responsive to a controller-determinable time during the engine start cycle changes the first setting to the second setting. In a preferred implementation, the power source comprises a pair of batteries which are permanently connected in series.

24 Claims, 6 Drawing Sheets

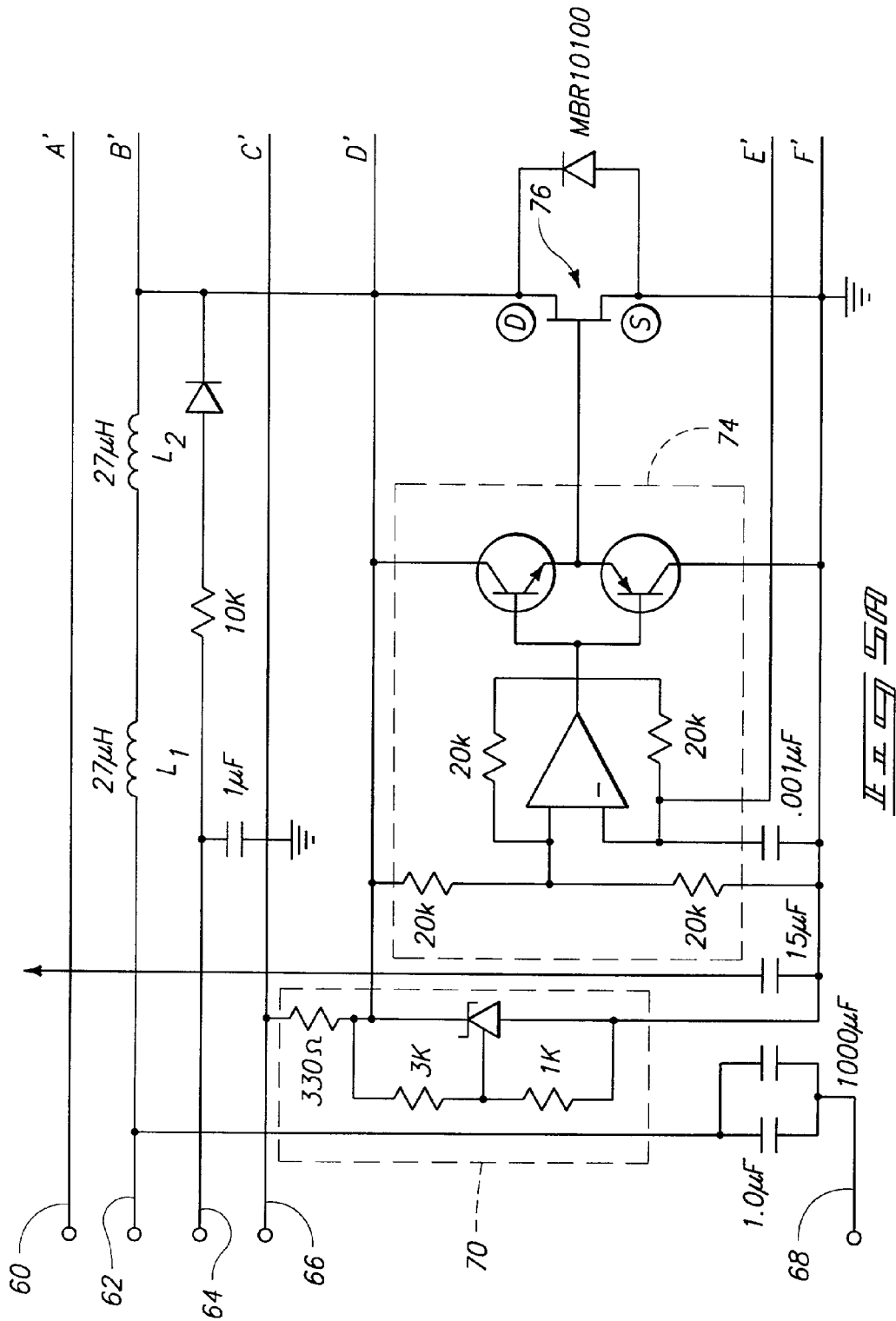

TURBINE AIRCRAFT ENGINE STARTING METHOD

RELATED PATENT DATA

This divisional patent application resulted from U.S. pat. application Ser. No. 08/933,874, filed Sep. 19, 1997 U.S. Pat. No. 6,018,971.

TECHNICAL FIELD

This invention pertains to starter systems and controllers for turbine aircraft engines and to methods of starting turbine aircraft engines.

BACKGROUND OF THE INVENTION

Turbine aircraft engines are started by beginning engine rotation, introducing fuel at a proper time to achieve ignition, and accelerating the engine to a self-sustaining ground idle condition. The whole process is commonly known as the start cycle. An electric starter or starter/generator is used to initially rotate the engine and accelerate it to the point where it runs under its own power.

During the time between initial engine rotation and fuel ignition, the engine does not experience a meaningful amount of temperature-induced stress. However, at the point of ignition through acceleration to ground idle, the engine does experience a meaningful amount of temperature-induced stress. In fact, the stress experienced by the engine during this time is greater than the stress experienced during takeoff and flight. Hence, it is desirable to reduce the time exposure within the engine start cycle between ignition and ground idle. It is also desirable to reduce the temperature which is seen by the engine during this time.

One solution to reducing the engine's start cycle duration might be to accelerate the engine as rapidly as possible through the start cycle beginning with initiation of the start cycle. This however poses some problems which are equally if not more stressful on the engine. One might, for example, initially supply the starter with all of the power necessary for the starter to take the engine through the entire start cycle. Doing so does not meaningfully improve the quality of the start and can stress electrical components including the starter, which are susceptible to heat damage caused through the dissipation of excess current and engine torque. Over a period of time, such electrical and engine components can wear out prematurely and require replacement. It would be ideal to have an engine start system which is sensitive to the engine start cycle and can react and manage the cycle for efficient and low-stress engine starts.

This invention arose out of concerns associated with providing a starter system for a turbine aircraft engine which monitors and manages the start cycle to produce a more efficient start with less stress to the engine.

SUMMARY OF THE INVENTION

Turbine aircraft engine starter systems and controllers for use therewith, and methods of starting turbine aircraft engines are described. A starter is operably connected with an aircraft engine and configured to initiate an engine start cycle which includes engine rotation and a fuel ignition point. In one aspect, a power source is connected with the starter and is configured to provide power thereto in accordance with at least first and second settings which apply different magnitudes of voltage to the starter. The first setting initiates the engine start cycle and the second setting accelerates the engine through the start cycle after the fuel ignition point. A controller is operably connected with the starter and the power source and is configured to monitor the engine start cycle and responsive to a controller-determinable time during the engine start cycle changes the first setting to the second setting. In a preferred implementation, the power source comprises a pair of batteries which are permanently connected in series.

BRIEF DESCRIPTION OF THE DRAWINGS

Preferred embodiments of the invention are described below with reference to the following accompanying drawings.

FIG. 5A is a circuit diagram of one portion of a power source monitor and charger in accordance with one implementation of the invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts"(Article 1, Section 8).

Figure 1:
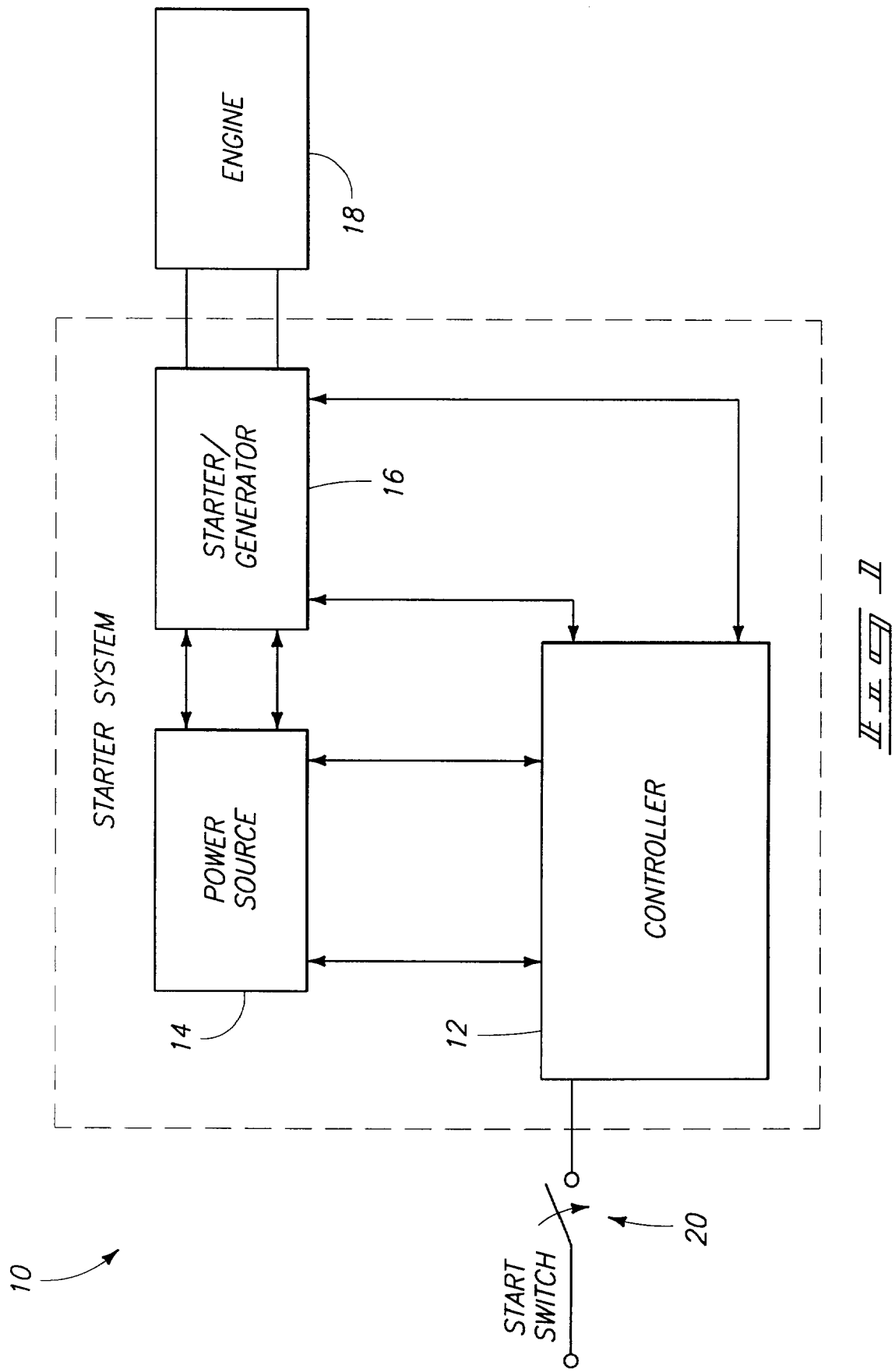
FIG. 1 is a high level block diagram of a starter system in accordance with one implementation of the present invention.

Referring to FIG. 1, one starter system in accordance with a preferred embodiment of the present invention is set forth generally at 10 and is configured for use with a turbine aircraft engine. In the illustrated example, system 10 comprises three primary components: a controller 12, a power source 14, and a starter 16 which can also be operated as a generator. The starter, however, can be a stand alone starter.

Starter system 10, through starter 16, is operably connected with an aircraft engine 18 and is configured to initiate the engine start cycle. Power source 14 is connected with starter 16 and is configured to provide power thereto. Power source 14 preferably includes at least first and second settings which apply different magnitudes of voltage to starter 14 during the engine start cycle. The first setting is a lower setting and initiates the engine start cycle. The second setting is a higher setting and provides sufficient power to accelerate the engine through the engine start cycle up to the ground idle condition. Controller 12 is operably connected with starter 16 and power source 14 and is configured to monitor the engine start cycle. Controller 12 is responsive to a determinable time or point during the engine start cycle at which time the controller changes the first setting to the second setting. The point at which the controller changes power source settings is proximate the point at which fuel is provided into engine 18 and ignited. Starter system 10 is brought on line by a user-actuable start switch 20 which signals controller 12 to initiate the start protocol.

Figure 2:
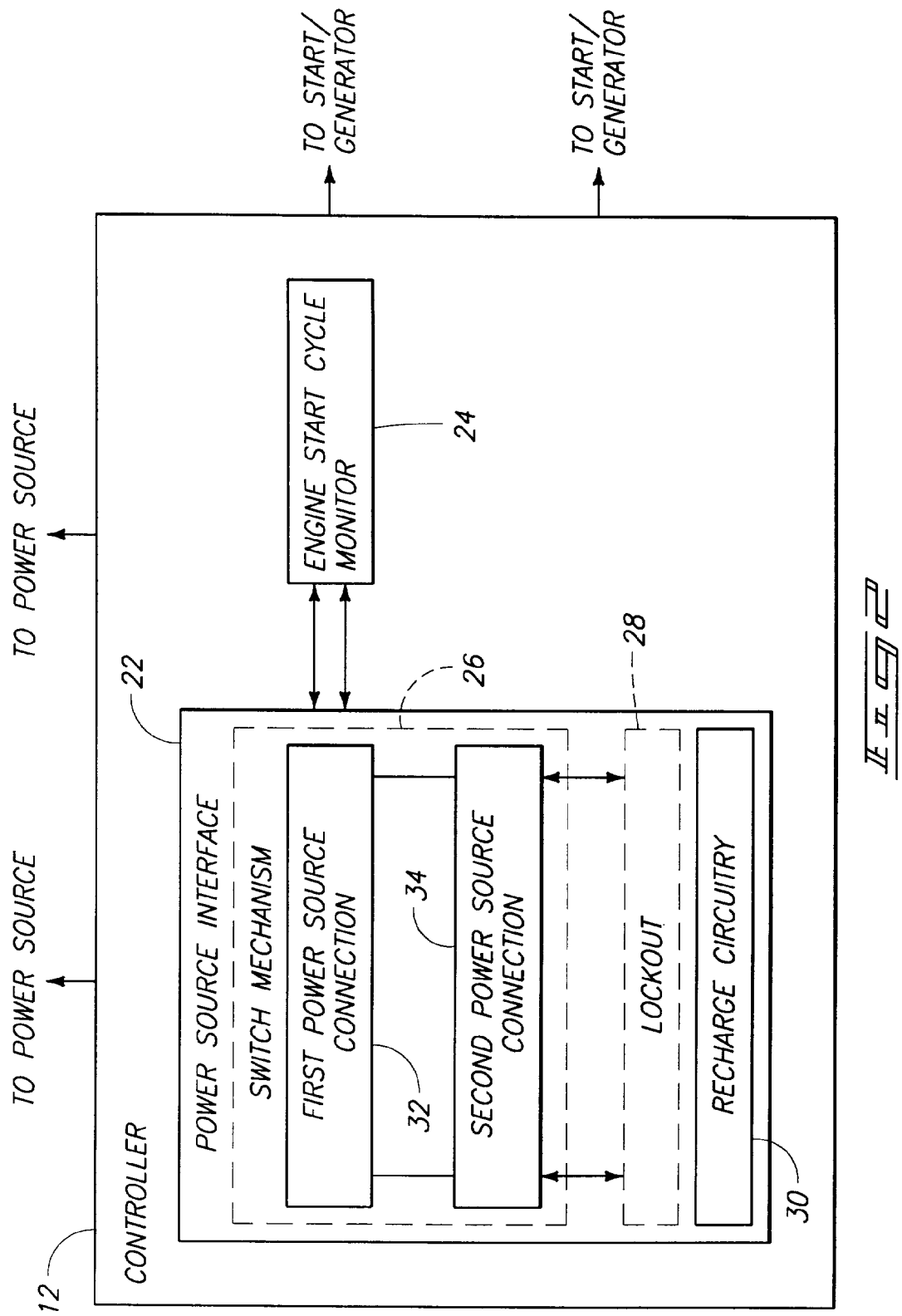
FIG. 2 is a block diagram of a controller in accordance with one implementation of the present invention.

Referring to FIG. 2, controller 12 is set forth in more detail. In the illustrated example, controller 12 comprises a power source interface 22 and an engine start cycle monitor 24.

Power source interface 22 includes a switch mechanism 26, an automatic lockout mechanism 28, and recharge circuitry 30. Switch mechanism 26 is operably connected with power source 14 and is configured to provide a first power source connection 32 to starter 16. First power source connection 32 initiates the engine start cycle and corresponds the above-mentioned first setting. Switch mechanism 26 also provides a second power source connection 34 during a latter part of the start cycle. The second power source connection corresponds to the above-mentioned second setting. The first and second power source connections are established with the starter and facilitate engine starting. In one aspect of the invention, power source 14 comprises a pair of batteries and the first power source connection comprises only one of the batteries. In accordance with this aspect of the invention, the second power source connection comprises both of the batteries. In a preferred aspect of the invention, the pair of batteries are connected permanently in series so that the second power source connection comprises both series-connected batteries. An exemplary power source comprises a pair of 24-volt batteries. Accordingly, the voltage available during the second power source connection is a sum of the voltages of both batteries, e.g. 48 volts. The additional voltage facilitates acceleration through the engine start cycle to the ground idle condition. A specific circuitry implementation of switch mechanism 26 is described in more detail below in connection with FIG. 4.

Lockout mechanism 28 is operably connected with switch mechanism 26 and is configured to prevent activation of the second setting, e.g., the higher voltage series connection, without deactivation or disconnection of the first setting. This prevents a system malfunction during the engine start cycle. In this way, lockout mechanism 28 provides mutual exclusivity between the first and second power source connections. A specific circuitry implementation of lockout mechanism 28 is described below in connection with FIG. 4.

Recharge circuitry 30 is provided and is configured to monitor the respective voltages of each or any of the batteries, and facilitate recharging of the batteries when the respective voltage falls below a predetermined level. In the preferred series-connected batteries, recharge circuitry 30 is configured to monitor both a bottom or first battery and a top or second battery. The bottom battery of the series-connected pair is utilized as an auxiliary power source to supply power to ancillary aircraft systems in the event that generator 16 (FIG. 1) fails to supply power thereto. Accordingly, recharge circuitry 30 monitors a voltage condition of the bottom battery and recharges the bottom battery through the top battery in the event the voltage level drops below a predetermined level. Recharge circuitry 30 also monitors the top battery and enables the top battery to be recharged through starter/generator 16 in the event the top battery voltage falls below a predetermined level. A specific circuitry implementation of recharge circuitry 30 is described in more detail below in connection with FIGS. 5A and 5B.

Engine start cycle monitor 24 is operably coupled with starter 16 (FIG. 1) and switch mechanism 26. Engine start cycle monitor 24 is configured to monitor the engine start cycle initiated by first power source connection 32. Engine start cycle monitor 24 responds to a predetermined time or point in the engine start cycle and enables switch mechanism 24 to change the power source connection to second power source connection 34. In a preferred implementation, engine start cycle monitor 24 comprises a current flow monitor which is configured to monitor the current flow through starter 16 during the engine start cycle. Responsive to a current flow condition at which the current flow has decayed to a predetermined level, the current flow monitor effects the pertinent power source connection changes. A specific circuitry implementation of an engine start cycle monitor is discussed below in connection with FIG. 4. It will be understood that the above-described controller can be implemented in any suitable hardware, software, or firmware and that the below-described circuitry implementation is but one example of a hardware configuration.

Figure 3:
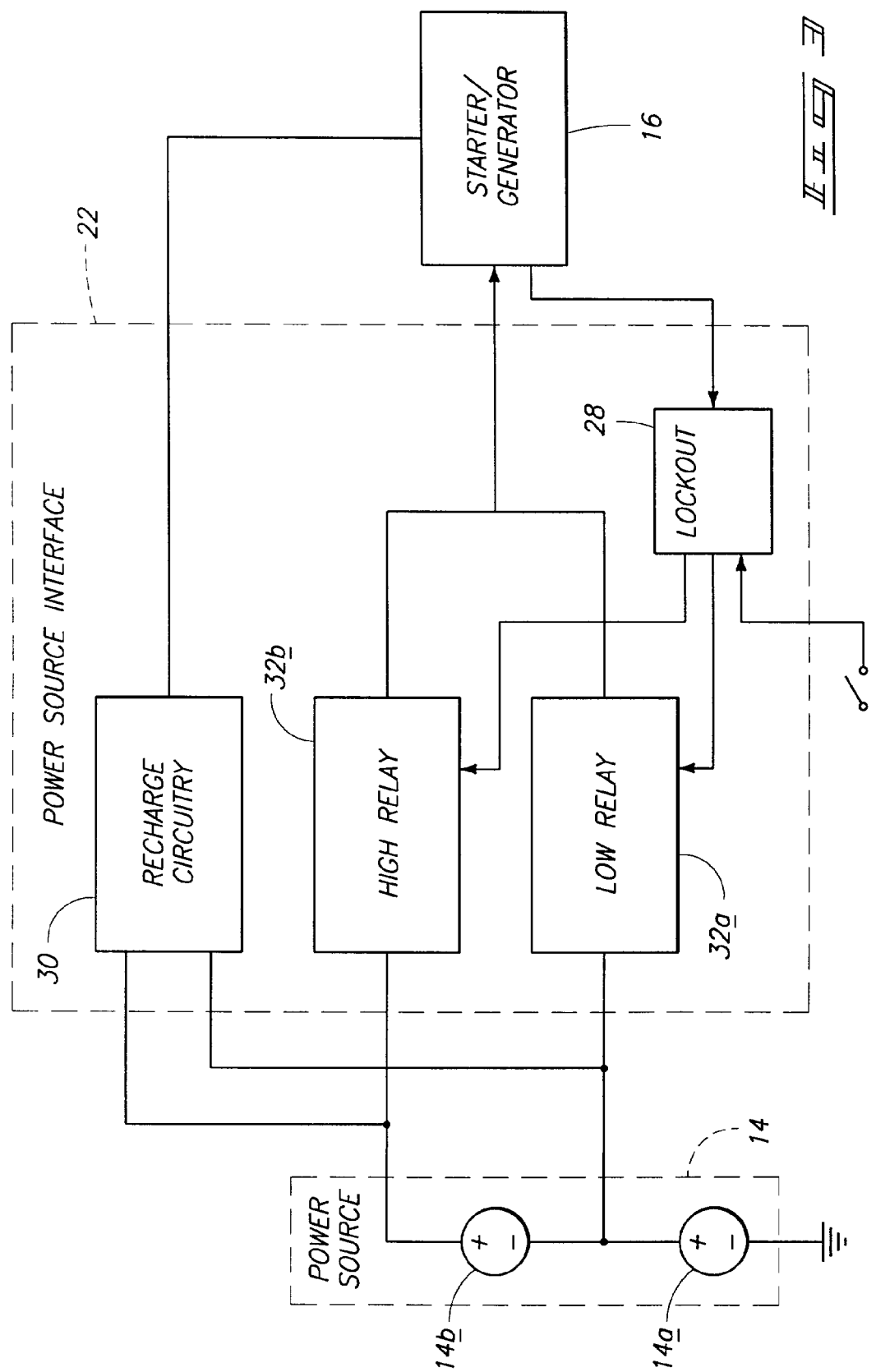
FIG. 3 is a block diagram of a power source interface in accordance with one implementation of the present invention.

Referring to FIG. 3, power source 14 includes a pair of series-connected batteries 14a, 14b. For the purpose of the ongoing discussion, battery 14a constitutes a first or bottom battery of the series, and battery 14b constitutes a second or top battery of the series. In the illustrated example, a first relay 32a is provided and enables activation of the first power source connection or setting. First relay 32a establishes a low voltage setting across only battery 14a. The low voltage setting initiates the engine start protocol by causing current to flow into the starter which, in turn, begins engine rotation. Throughout the beginning of engine rotation, the starter experiences a current decay due to the electromotive force of the starter. When the starter's current decay reaches a sufficiently low level, first relay 32 is deactivated and second relay 32b is activated which establishes the second power source connection or setting. Because such connection or setting comprises both of batteries 14a, 14b in series, the voltage provided to starter 16 is increased which enables the starter to overcome the electromotive force and achieve good acceleration through the engine start cycle. In this example, the respective relays can be selectively energized to establish the requisite connections with starter 16.

Figure 4:
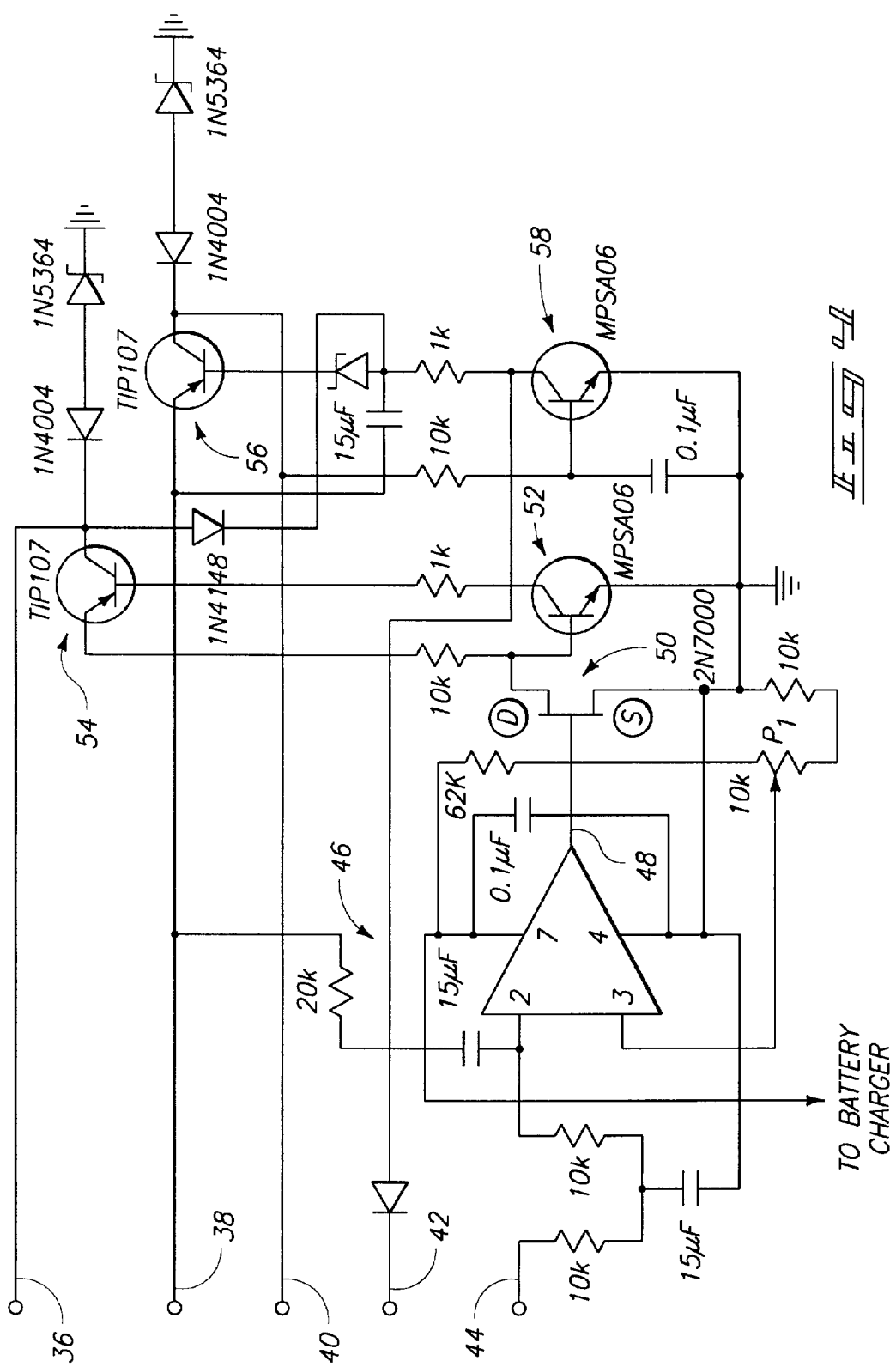
FIG. 4 is a circuit diagram of an engine start cycle monitor in accordance with one implementation of the invention.

Referring to FIG. 4, portions of power source interface 22 and engine start cycle monitor 24 have been implemented in specific circuitry. It is to be understood that such implementation constitutes but one specific implementation of the present invention. Accordingly, other implementations, and ones which do not necessarily include the electronic componentry described just below can be utilized. The specific elemental interconnections of the FIG. 4 circuitry will not be described as such are self-evident from the drawing and will be understood by the skilled artisan. Pertinent functional aspects will, however, be discussed below.

The circuitry of FIG. 4 includes five lines designated 36, 38, 40, 42, and 44. Line 36 constitutes an output line to first relay 32a (FIG. 3). Line 38 constitutes an input signal from start switch 20 (FIG. 1). Line 40 constitutes an output line to second relay 32b (FIG. 3). Line 42 constitutes a line which extends to starter 16 (FIG. 3) and senses when the starter is energized. Line 44 constitutes a current sense line which extends to starter 16.

In the illustrated example, the engine start cycle monitor comprises comparator circuitry 46 which is configured to measure an operating parameter of the starter and produce outputs via line 48. The operating parameter which is measured or detected by comparator circuit 46 is associated with a current flow condition through the starter. A field effect transistor 50 is provided and is operably coupled with comparator circuitry 46 and is configured to receive the output thereof via line 48. Transistor 50 is gated by comparator circuitry 46 and can assume either a conductive or a non-conductive state according to the outputs provided by the comparator circuitry. Transistor 50 constitutes a first transistor switch. An NPN transistor 52 is provided and has its base connected with the drain of transistor 50. The collector of transistor 52 is connected through a 1K resistor to the base of a PNP transistor 54. Transistor 56 has its emitter tied to line 38 and its collector tied to line 40. The base of transistor 56 is connected through a zener diode to the collector of an NPN transistor 58. The base of transistor 58 is connected through a 10 K resistor with line 40.

Comparator circuitry 46 is configured as a voltage comparator which compares the current feedback signal from line 44 to a precision preset voltage that determines at what point in the engine start cycle a transition is to be made from the first power source connection 32 (FIG. 2) to the second power source connection 34. When the output of comparator circuitry 46 goes high, transistor 50 turns on and accordingly shuts off transistors 52, 54. Consequently, first relay 32a is deenergized and transistor 56 is allowed to conduct. When transistor 56 conducts, second relay 32b is energized. Accordingly, a transition is made between the first power source connection and the second power source connection. In the illustrated example, the above circuit constitutes one in which at least two bipolar junction transistors are separately operated upon by field effect transistor 50 and thereby effect a change between the first and second settings. Accordingly, transistors 50, 52, and 54 can be considered as a first relay assembly which is capable of establishing the first power source connection when comparator circuitry 46 produces a first or low output. Similarly, transistors 50, 56 can be considered as a second relay assembly which is capable of establishing the second power source connection when comparator circuitry 46 produces a second or high output.

A lockout mechanism or circuitry is provided by virtue of the fact that if the voltage on line 42 fails to go low after comparator circuitry 46 has changed state (symptomatic of first relay 32a not deenergizing), transistor 56 will not be able to conduct and therefor second relay 32b will be locked out.

Other implementations of the above-described power source interface can be provided. For example, pulse width modulation can be utilized to initiate the engine start cycle and take the engine therethrough. A switch means, such as a suitable transistor, can be connected between the power source and the starter. Such switch means can be gated or modulated by a suitable pulse width modulator. By initiating the start cycle with a relatively low duty cycle, the in-rush current into the starter is initially low, but of sufficient magnitude to start the engine cycle. By increasing the duty cycle gradually over the engine start cycle, an increasing amount of voltage can be provided to the starter and thus overcome the electromotive force of the starter. In one implementation, the pulse width modulator is configured as a switched mode buck converter to control the power to the starter. Basic buck mode converters are described by Richard C. Dorf in *The Electrical Engineering Handbook*, Chapter 29—Power Electronics, CRC Press, which is hereby incorporated by reference herein.

In another implementation, an auxiliary power unit (APU) can be utilized as a power source and modulated or controlled to achieve a desired engine start as described above. For example, the voltage regulator of the APU generator system can be modified such that when the APU is being used to power the electric starter, the voltage is allowed to increase during the latter part of the engine start cycle thus overcoming the counter electromotive force of the starter and providing faster acceleration during the latter part of the start.

Figure 5B:
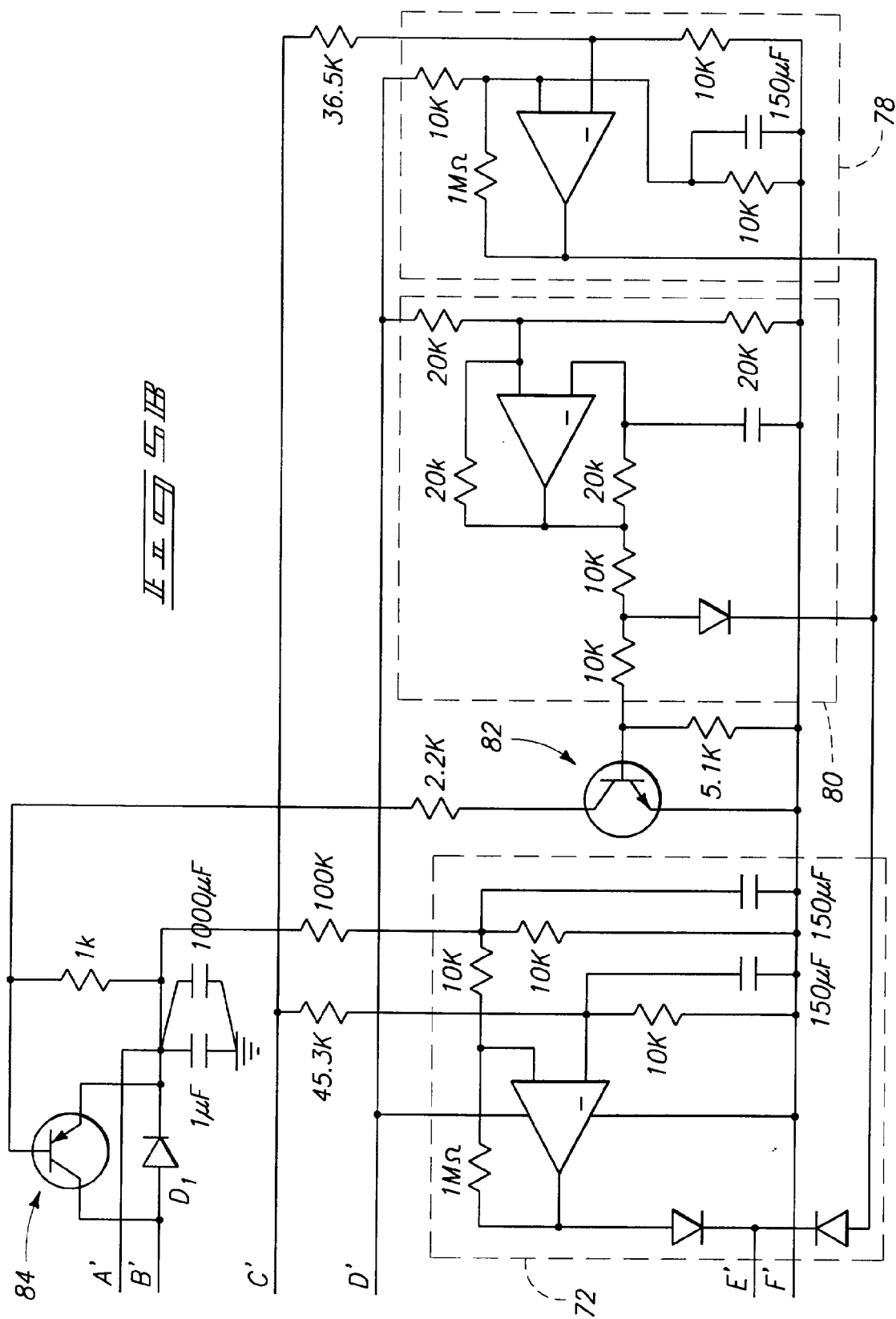
FIG. 5B is a circuit diagram of another portion of a power source monitor and charger in accordance with one implementation of the invention.

Referring to FIGS. 5A–B, a specific circuitry implementation of the above-described recharge circuitry 30 (FIG. 3) is described. As above, the specific elemental interconnections of the illustrated circuitry will not be described. However, pertinent functional behavior of the circuit will be described.

Referring to FIG. 5A, the circuit includes line 60, 62, 64, 66, and 68. Line 60 constitutes a line which enables the voltage on battery 14b (FIG. 3) to be sensed. Line 62 constitutes a 24-28 volt power input line. Line 64 constitutes a drive indicator lamp which indicates that battery 14b is being charged. Line 66 constitutes a line which enables the voltage on battery 14a to be sensed. Line 68 constitutes ground.

A voltage regulator 70 is provided and enables a precision reference voltage for the transition between first and second power source connections and the battery charger function described just below. Voltage comparator circuitry 72 provides a low output if the voltage on top battery 14b (FIG. 3) is less than two times the voltage on bottom battery 14a. An oscillator 74, responsive to a low output on comparator 72 operates as a free running oscillator which causes transistor 76 to periodically conduct. When transistor 76 is in a conductive state, current flows in inductive elements $L_1$ and $L_2$. When transistor 76 is in a non-conductive state, energy which is stored in inductive elements $L_1$ and $L_2$ is provided into top battery 14b through diode $D_1$ (FIG. 5B). Once sufficient charge has been provided into top battery 14b through multiple cycles of oscillator 74, the terminal voltage on battery 14b will reach twice the voltage on battery 14a. At this point, comparator 72 will change states and oscillator 74 will stop oscillating. Accordingly, charging which is effectuated by oscillator 74 will terminate. The above-described voltage comparator 72, oscillator 74, and transistor 76 constitute a battery charger which is configured to monitor second battery 14b and determine when the voltage of the second battery reaches a predetermined level relative to the voltage of first battery 14a. Responsive to achieving the predetermined level, the battery charger enables charging of battery 14b by starter/generator 16 (FIG. 3). Transistor 76 together with elements $L_1$ and $L_2$ comprise a current flow regulator which regulates the current which is provided into top battery 14b.

As mentioned above, starter/generator 16 is configured to supply power to ancillary aircraft systems after engine start has been achieved. In the event the generator fails however, first or bottom battery 14a is configured to provide power to such ancillary aircraft systems. Accordingly, the aircraft loads will start draining bottom battery 14a and will cause its terminal voltage to decay. A voltage comparator 78 is provided and is configured to monitor the bottom battery and compare the battery's terminal voltage with a predetermined threshold value. When the voltage decay of battery 14a has reached the predetermined threshold value, an oscillator 80 which is operably connected therewith is provided into an oscillating state. Such oscillation causes transistor 82 and transistor 84 to periodically conduct. When transistor 84 conducts, current flows through elements $L_1$ and $L_2$ and into bottom battery 14a (FIG. 3). When transistor 84 does not conduct, energy which is stored in elements $L_1$ and $L_2$ is dumped into bottom battery 14a. In this way, top battery 14b supports bottom battery 14a during emergency operations.

Additionally, when comparator 78 changes state so as to enable oscillator 80, oscillator 74 is blocked from oscillating which provides an interlocking safety feature. Transistors 82, 84 function as a current flow regulator which regulates current supplied from second battery 14b to first battery 14a. Voltage comparator 78 monitors first battery 14a and enables elements $L_1$ and $L_2$ to act as a battery charger to supply current from second battery 14b into first battery 14a.

The above-described starter system, controller, and methodology provide a number of advantages. A much faster acceleration from the ignition point to the ground idle condition can be achieved. This can reduce the thermal stress experienced by the engine's components. By providing a cycle-starting first setting which is lower in power magnitude than the second setting, stress on the starter, batteries, relays and accessory gears in the engine is not meaningfully increased if at all. A reduction of the peak current during the engine start cycle can be achieved. Further, there can be a reduction in the torque experienced by the starter at initiation of the engine start cycle. After ignition, however, such torque can be dramatically increased. Moreover, provided circuitry can prevent initial engine starts at the high power setting and also protects against so-called hung starts by ensuring that the low setting is disengaged before the high setting is engaged. Further, the battery charging and monitoring functions can provide for emergency power in the event the generator goes off line during flight.

In addition to these advantages, the present invention can have a modular aspect in that current in-place aircraft starting systems can be retrofitted with a controller as described above with little extra hardware or human effort. For example, in many current systems with two or more batteries already installed, implementation can require only the addition of a second relay, the controller module, and an associated wire harness. Thus, current aircraft starting systems can be readily adapted to incorporate one or more aspects of the present invention.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A turbine aircraft engine starting method for a starting system which includes a power source and a starter for initiating an engine start cycle, the method comprising:
    providing power from the power source to the starter to initiate the engine start cycle;
    monitoring the engine start cycle;
    detecting a selected time in the engine start cycle after initiation of the engine start cycle and prior to a ground idle condition; and
    responsive to said detecting and during the engine start cycle, increasing the power provided to the starter.

2. A turbine aircraft engine starting method for a starting system which includes a power source and a starter for initiating an engine start cycle, the method comprising:
    providing power from the power source to the starter to initiate the engine start cycle;
    monitoring the engine start cycle;
    detecting a selected time in the engine start cycle after initiation of the engine start cycle and prior to a ground idle condition; and
    responsive to said detecting and during the engine start cycles changing the power provided to the starter by applying a duty-cycle dependent voltage to said starter and increasing the duty cycle after a fuel ignition time in the engine start cycle.

3. A turbine aircraft engine starting method for a starting system which includes a power source and a starter for initiating an engine start cycle the method comprising:
    providing power from the power source to the starter to initiate the engine start cycle;
    monitoring the engine start cycle;
    detecting a selected time in the engine start cycle after initiation of the engine start cycle and prior to a ground idle condition; and
    responsive to said detecting and during the engine start cycle, changing the power provided to the starter, wherein the power source comprises at least two batteries connected in series, and:
        providing power comprises providing power from one of the batteries; and
        changing the power comprises providing power from both of the series-connected batteries.

4. The method of claim 3, wherein the detecting of the selected time comprises monitoring current through the starter and determining when said current has decayed a sufficient amount.

5. The method of claim 1 further comprising providing recharge means for recharging the power source.

6. A turbine aircraft engine starting method for a starting system which includes a power source and a starter for initiating an engine start cycle, the method comprising:
    providing power from the power source to the starter to initiate the engine start cycle:
    monitoring the engine start cycle;
    detecting a selected time in the engine start cycle after initiation of the engine start cycle and prior to a ground idle condition;
    responsive to said detecting and during the engine start cycle changing the power provided to the starter; and
    providing recharge means for recharging the power source, wherein said power source comprises a bottom battery and a top battery connected in series with one another and said recharge means comprises voltage monitoring means configured to monitor terminal voltage of both of the batteries and (a) recharge the bottom battery through the top battery when the bottom battery terminal voltage drops below a pre-determined level, and (b) recharge the top battery through the starter when the top battery terminal voltage drops below a pre-determined level.

7. The method of claim 1, wherein monitoring the engine start cycle includes monitoring a current to the starter, and wherein detecting a selected time in the engine start cycle includes determining when the starter current decreases below a predetermined level.

8. The method of claim 1, wherein monitoring the engine start cycle includes monitoring an electromotive force from the starter, and wherein detecting a selected time in the engine start cycle includes determining when the electromotive force achieves a predetermined level.

9. The method of claim 1, wherein monitoring the engine start cycle includes measuring a time from a beginning of providing power from the power source to the starter, and wherein detecting a selected time in the engine start cycle includes determining when a predetermined interval has elapsed.

10. The method of claim 2, wherein monitoring the engine start cycle includes monitoring a current to the starter, and wherein detecting a selected time in the engine start cycle includes determining when the starter current decreases below a predetermined level.

11. The method of claim 2, wherein monitoring the engine start cycle includes monitoring an electromotive force from the starter, and wherein detecting a selected time in the engine start cycle includes determining when the electromotive force achieves a predetermined level.

12. The method of claim 2, wherein monitoring the engine start cycle includes measuring a time from a beginning of providing power from the power source to the starter, and wherein detecting a selected time in the engine start cycle includes determining when a predetermined interval has elapsed.

13. The method of claim 3, wherein monitoring the engine start cycle includes monitoring an electromotive force from the starter, and wherein detecting a selected time in the engine start cycle includes determining when the electromotive force achieves a predetermined level.

14. The method of claim 3, wherein monitoring the engine start cycle includes measuring a time from a beginning of providing power from the power source to the starter, and wherein detecting a selected time in the engine start cycle includes determining when a predetermined interval has elapsed.

15. The method of claim 6, wherein monitoring the engine start cycle includes measuring a time from a beginning of providing power from the power source to the starter, and wherein detecting a selected time in the engine start cycle includes determining when a predetermined interval has elapsed.

16. The method of claim 6, wherein monitoring the engine start cycle includes monitoring an electromotive force from the starter, and wherein detecting a selected time in the engine start cycle includes determining when the electromotive force achieves a predetermined level.

17. A turbine aircraft engine starting method for a starting system which includes a power source and a starter for initiating an engine start cycle, the method comprising:

provide power from the power source to the starter by applying a duty-cycle dependent voltage to initiate the engine start cycle;

detecting a selected time in the engine start cycle after initiation of the engine start cycle and prior to a ground idle condition; and responsive to said detecting and during the engine start cycle, changing the power provided to the starter by changing the duty cycle.

18. The method of claim 17, wherein changing the duty cycle comprises increasing the duty cycle.

19. The method of claim 17, wherein detecting a selected time in the engine start cycle includes determining when current to the starter decreases below a predetermined level.

20. The method of claim 17, wherein detecting a selected time in the engine start cycle includes determining when an electromotive force from the starter achieves a predetermined level.

21. The method of claim 17, wherein detecting a selected time in the engine start cycle includes determining when a predetermined interval has elapsed.

22. A turbine aircraft engine starting method for a starting system which includes a power source and a starter for initiating an engine start cycle, the method comprising:

providing power at a first power level from the power source to the starter to initiate the engine start cycle;

detecting a selected time in the engine start cycle after initiation of the engine start cycle and prior to a ground idle condition; and responsive to said detecting and during the engine start cycle, changing the power provided to the starter from the first level to a second level, wherein changing the power provided to the starter comprises increasing the power provided to the starter.

23. A turbine aircraft engine starting method for a starting system which includes a power source and a starter for initiating an engine start cycle, the method comprising:

providing power at a first power level from the power source to the starter to initiate the engine start cycle;

detecting a selected time in the engine start cycle after initiation of the engine start cycle and prior to a ground idle condition; and responsive to said detecting and during the engine start cycle, changing the power provided to the starter from the first level to a second level, wherein detecting a selected time in the engine start cycle includes determining when current to the starter decreases below a predetermined level.

24. A turbine aircraft engine starting method for a starting system which includes a power source and a starter for initiating an engine start cycle, the method comprising:

providing power at a first power level from the power source to the starter to initiate the engine start cycle;

detecting a selected time in the engine start cycle after initiation of the engine start cycle and prior to a ground idle condition; and responsive to said detecting and during the engine start cycle, changing the power provided to the starter from the first level to a second level, wherein detecting a selected time in the engine start cycle includes determining when an electromotive force from the starter achieves a predetermined level.

* * * * *